United States Patent
Lin

(10) Patent No.: US 10,084,695 B2
(45) Date of Patent: Sep. 25, 2018

(54) TRANSPORT NETWORK CONTROL METHOD, CONTROLLER AND NODE

(71) Applicant: Huawei Technologies Co., Ltd., Shenzhen (CN)

(72) Inventor: Yi Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 14/925,757

(22) Filed: Oct. 28, 2015

(65) Prior Publication Data
US 2016/0050143 A1 Feb. 18, 2016

Related U.S. Application Data

(63) Continuation of application No. PCT/CN2013/074961, filed on Apr. 28, 2013.

(51) Int. Cl.
*H04L 12/717* (2013.01)
*H04L 12/723* (2013.01)
(Continued)

(52) U.S. Cl.
CPC ............... *H04L 45/42* (2013.01); *H04L 41/00* (2013.01); *H04L 45/02* (2013.01); *H04L 45/54* (2013.01); *H04L 69/326* (2013.01)

(58) Field of Classification Search
None
See application file for complete search history.

(56) References Cited

U.S. PATENT DOCUMENTS 8,467,382 B1 * 6/2013 Doverspike ............ H04B 10/03
370/355
2008/0069133 A1 3/2008 Yong et al.
(Continued)

FOREIGN PATENT DOCUMENTS

CN 101155070 A 4/2008
CN 101420383 A 4/2009
(Continued)

OTHER PUBLICATIONS

"Series G: Transmission Systems and Media, Digital Systems and Networks; Digital networks—General aspects; Generic functional architecture of transport networks," ITU-T Recommendation G.805, pp. i-51, International Telecommunication Union, Geneva, Switzerland (Mar. 2000).

(Continued)

*Primary Examiner* — Duc T Duong
(74) *Attorney, Agent, or Firm* — Leydig, Voit & Mayer, Ltd.

(57) ABSTRACT

Embodiments of the present invention provide a transport network control method, a controller, and a node. The method includes: receiving, by a controller, a control request message of a path; determining, according to topology information of a transport network and an atomic behavior that is supported by each node in the transport network, at least one node that the path passes through in the transport network and at least one atomic behavior that the at least one node needs to execute; and sending a path configuration message that includes the atomic behavior to the at least one node correspondingly, so that each node configures a transport plane to execute the atomic behavior included in the message.

20 Claims, 9 Drawing Sheets

(51) Int. Cl.
- *H04L 12/24* (2006.01)
- *H04L 12/741* (2013.01)
- *H04L 12/751* (2013.01)
- *H04L 29/08* (2006.01)

(56) References Cited

U.S. PATENT DOCUMENTS

| | | | |
|---|---|---|---|
| 2010/0262705 A1* | 10/2010 | Li | H04W 28/00 709/229 |
| 2011/0013517 A1* | 1/2011 | So | H04L 45/04 370/238 |
| 2011/0173330 A1* | 7/2011 | Gong | H04W 28/26 709/226 |
| 2011/0261722 A1 | 10/2011 | Awano | |
| 2012/0189304 A1* | 7/2012 | Lin | H04J 3/1652 398/43 |
| 2013/0100817 A1* | 4/2013 | Oltman | H04L 45/125 370/238 |
| 2015/0271055 A1* | 9/2015 | Wang | H04L 45/00 370/238 |

FOREIGN PATENT DOCUMENTS

| | | |
|---|---|---|
| CN | 102868624 A | 1/2013 |
| EP | 1959609 A1 | 8/2008 |
| EP | 2352261 A1 | 8/2011 |
| EP | 2544417 A1 | 1/2013 |
| WO | WO 2008034351 A1 | 3/2008 |

OTHER PUBLICATIONS

"Series G: Transmission Systems and Media, Digital Systems and Networks; Digital terminal equipments—Other terminal equipment; Characteristics of optical transport network hierarchy equipment functional blocks," ITU-T Recommendation G.798, pp. i-379, International Telecommunication Union, Geneva, Switzerland (Dec. 2012).

* cited by examiner

TRANSPORT NETWORK CONTROL METHOD, CONTROLLER AND NODE

CROSS-REFERENCE TO RELATED APPLICATIONS

This application is a continuation of International Patent Application No. PCT/CN2013/074961, filed on Apr. 28, 2013, which is hereby incorporated by reference in its entirety.

TECHNICAL FIELD

Embodiments of the present invention relate to communications technologies, and in particular, to a transport network control method, a controller and a node.

BACKGROUND

A function of a transport network is to transport a service for a user. The transport network may use multiple transport technologies, such as a synchronous digital hierarchy (SDH), an optical transport network (OTN), and wavelength division multiplexing (WDM). A conventional transport network is a static system, and path creation, maintenance, removing and the like in the network all need to be configured manually by using a network management system. With an increasing growth of data services, such a connection manner cannot satisfy dynamic and flexible requirements imposed by a user on an optical network system. Therefore, the International Telecommunication Union-Telecommunication Standardization Sector (ITU-T) puts forward an automatically switched optical network (ASON) architecture. In the architecture, a control plane is added to a conventional optical network, to implement a function of automatically controlling the optical network. Then, the Internet Engineering Task Force (IETF) defines, based on the control plane, a generalized multi-protocol label switching (GMPLS) protocol stack, which implements functions such as automatic link discovery, path calculation and automatic path establishment in a network by executing protocols related to link management, routing, signaling, and the like.

In the prior art, distributed GMPLS is used to control a transport network. Each node runs a routing protocol such as Open Shortest Path First-Traffic Engineering (OSPF-TE), and a signaling protocol such as Resource Reservation Protocol-Traffic Engineering (RSVP-TE) to implement control over the transport network. However, once an operator needs to upgrade control functions of nodes in a network (for example, upgrading for using a new routing algorithm, or upgrading for supporting automatic control over optical power), control planes (including a routing module, a signaling module, and the like) of all nodes in the entire network need to be upgraded, so that an upgrading process is rather complex, is likely to fail, and has a high risk.

SUMMARY

Embodiments of the present invention provide a transport network control method, a controller, and a node, which are used to solve problems in a transport network that an upgrading process is complex and has a high risk.

According to a first aspect, the present invention provides a transport network control method, including:

receiving, by a controller, a control request message of a path;

determining, by the controller according to topology information of a transport network and an atomic behavior that is supported by each node in the transport network, at least one node that the path passes through in the transport network and at least one atomic behavior that the at least one node needs to execute; and sending, by the controller, a path configuration message that includes the atomic behavior to the at least one node correspondingly, so that each node configures a transport plane to execute the atomic behavior included in the message, to implement a transport function requested in the control request message;

where the atomic behavior is a basic action forming a function that can be completed by a node.

With reference to the first aspect, in a first possible implementation manner of the first aspect, before the receiving, by a controller, a control request message of a path, the method further includes:

acquiring, by the controller, the topology information of the transport network and the atomic behavior that is supported by each node in the transport network.

With reference to the first possible implementation manner of the first aspect, in a second possible implementation manner of the first aspect, the acquiring, by the controller, the topology information of the transport network and the atomic behavior that is supported by each node in the transport network includes:

receiving, by the controller, the topology information of the transport network and the atomic behavior that is supported by each node in the transport network that are input by a user; or acquiring, by the controller by using a control channel established with each node in the transport network, the topology information of the transport network and the atomic behavior that is supported by each node in the transport network.

With reference to the second possible implementation manner of the first aspect, in a third possible implementation manner of the first aspect, the acquiring, by the controller by using a control channel established with each node in the transport network, the topology information of the transport network and the atomic behavior that is supported by each node in the transport network includes:

establishing, by the controller, the control channel to each node in the transport network; and collecting, by the controller, the topology information of the transport network by using the control channel, and receiving, by using the control channel, the atomic behavior that is supported and sent by each node in the transport network.

With reference to any one of the first aspect to the third possible implementation manner of the first aspect, in a fourth possible implementation manner of the first aspect, the determining, by the controller according to topology information of a transport network and an atomic behavior that is supported by each node in the transport network, at least one node that the path passes through in the transport network and at least one atomic behavior that the at least one node needs to execute includes:

invoking, by the controller, a control plug-in according to the control request message, where the control plug-in is used to calculate, according to the topology information of the transport network, the at least one node that the path passes through; and determining, by the controller according to the atomic behavior that is supported by each node in the transport network, the at least one atomic behavior that the at least one node needs to execute.

With reference to the fourth possible implementation manner of the first aspect, in a fifth possible implementation manner of the first aspect, before the invoking, by the controller, a corresponding control plug-in according to the control request message, the method further includes:

maintaining, by the controller, the control plug-in that is installed by using a control plug-in interface.

With reference to any one of the first aspect to the fifth possible implementation manner of the first aspect, in a sixth possible implementation manner of the first aspect, the receiving, by a controller, a control request message of a path includes:

receiving, by the controller, a control request message of a path that is configured by a network manager; or receiving, by the controller, a control request message of a path that is driven by an application layer; or receiving, by the controller, a control request message of a path that is driven by a transport network.

With reference to any one of the first aspect to the sixth possible implementation manner of the first aspect, in a seventh possible implementation manner of the first aspect, the control request message of the path includes:

an establishment request message of the path, a modification request message of the path, a deletion request message of the path, or a rerouting request message of the path.

With reference to any one of the first aspect to the seventh possible implementation manner of the first aspect, in an eighth possible implementation manner of the first aspect, the atomic behavior includes: a configurable location and configurable content of the atomic behavior; and the sending, by the controller, a message that includes the atomic behavior to the at least one node correspondingly, so that each node executes the atomic behavior included in the message, to configure the transport plane includes:

sending, by the controller, a message that includes the configurable location and the configurable content of the atomic behavior to the at least one node correspondingly, so that each node configures the transport plane according to the configurable location and the configurable content of the atomic behavior.

With reference to any one of the first aspect to the eighth possible implementation manner of the first aspect, in a ninth possible implementation manner of the first aspect, the path configuration message is an openflow (OF) message or an extensible markup language (XML) message.

With reference to any one of the first aspect to the ninth possible implementation manner of the first aspect, in a tenth possible implementation manner of the first aspect, the transport network includes any one of the following:

a synchronous digital hierarchy (SDH), a synchronous optical network (SONET), an optical transport network (OTN), and wavelength division multiplexing (WDM).

According to a second aspect, an embodiment of the present invention provides a transport network control method, including:

receiving, by a node, a path configuration message that is sent by a controller and includes an atomic behavior; and configuring, by the node, a transport plane according to the path configuration message, and executing the atomic behavior included in the message.

With reference to the second aspect, in a first possible implementation manner of the second aspect, before the receiving, by a node, a path configuration message that is sent by a controller and includes an atomic behavior, the method further includes:

sending, by the node, a supported atomic behavior to the controller by using a control channel between the node and the controller.

According to a third aspect, an embodiment of the present invention provides a controller, including:

a receiving module, configured to receive a control request message of a path;

a determining module, configure to determine, according to topology information of a transport network and an atomic behavior that is supported by each node in the transport network, at least one node that the path passes through in the transport network and at least one atomic behavior that the at least one node needs to execute; and a sending module, configured to send a path configuration message that includes the atomic behavior to the at least one node correspondingly, so that each node configures a transport plane to execute the atomic behavior included in the message, to implement a transport function requested in the control request message;

where the atomic behavior is a basic action forming a function that can be completed by a node.

With reference to the third aspect, in a first possible implementation manner of the third aspect, the controller further includes:

an acquiring module, configured to acquire the topology information of the transport network and the atomic behavior that is supported by each node in the transport network.

With reference to the first possible implementation manner of the third aspect, in a second possible implementation manner of the third aspect, the acquiring module is specifically configured to receive the topology information of the transport network and the atomic behavior that is supported by each node in the transport network that are input by a user; or acquire, by using a control channel established with each node in the transport network, the topology information of the transport network and the atomic behavior that is supported by each node in the transport network.

With reference to the second possible implementation manner of the third aspect, in a third possible implementation manner of the third aspect, the acquiring module includes:

an establishing unit, configured to establish the control channel to each node in the transport network;

a collecting unit, configured to collect the topology information of the transport network by using the control channel; and a receiving unit, configured to receive, by using the control channel, the atomic behavior that is supported and sent by each node in the transport network.

With reference to any one of the third aspect to the third possible implementation manner of the third aspect, in a fourth possible implementation manner of the third aspect, the determining module includes:

an invoking unit, configured to invoke a control plug-in according to the control request message, where the control plug-in is used to calculate, according to the topology information of the transport network, the at least one node that the path passes through; and a determining unit, configured to determine, according to the atomic behavior that is supported by each node in the transport network, the at least one atomic behavior that the at least one node needs to execute.

With reference to the fourth possible implementation manner of the third aspect, in a fifth possible implementation manner of the third aspect, the controller further includes:

a maintenance module, configured to maintain the control plug-in that is installed by using a control plug-in interface.

With reference to any one of the third aspect to the fifth possible implementation manner of the third aspect, in a sixth possible implementation manner of the third aspect, the receiving module is specifically configured to receive a control request message of a path that is configured by a network manager; or receive a control request message of a path that is driven by an application layer; or receive a control request message of a path that is driven by a transport network.

With reference to any one of the third aspect to the sixth possible implementation manner of the third aspect, in a seventh possible implementation manner of the third aspect, the control request message of the path includes:

an establishment request message of the path, a modification request message of the path, a deletion request message of the path, or a rerouting request message of the path.

With reference to any one of the third aspect to the seventh possible implementation manner of the third aspect, in an eighth possible implementation manner of the third aspect, the sending module is specifically configured to send a message that includes a configurable location and configurable content of the atomic behavior to the at least one node correspondingly, so that each node configures the transport plane according to the configurable location and the configurable content of the atomic behavior.

With reference to any one of the third aspect to the eighth possible implementation manner of the third aspect, in a ninth possible implementation manner of the third aspect, the path configuration message is an OF message or an XML message.

With reference to any one of the third aspect to the ninth possible implementation manner of the third aspect, in a tenth possible implementation manner of the third aspect, the transport network includes any one of the following:

an SDH, an SONET, an OTN, and WDM.

According to a fourth aspect, an embodiment of the present invention provides a node, including:

a receiving module, configured to receive a path configuration message that is sent by a controller and includes an atomic behavior; and an execution module, configured to configure a transport plane according to the path configuration message, and execute the atomic behavior included in the message.

With reference to the fourth aspect, in a first possible implementation manner of the fourth aspect, the node further includes:

a sending module, configured to send a supported atomic behavior to the controller by using a control channel between the node and the controller.

According to a fifth aspect, an embodiment of the present invention provides a controller, including:

a receiver, configured to receive a control request message of a path;

a processor, configure to determine, according to topology information of a transport network and an atomic behavior that is supported by each node in the transport network, at least one node that the path passes through in the transport network and at least one atomic behavior that the at least one node needs to execute; and a transmitter, configured to send a path configuration message that includes the atomic behavior to the at least one node correspondingly, so that each node configures a transport plane to execute the atomic behavior included in the message, to implement a transport function requested in the control request message;

where the atomic behavior is a basic action forming a function that can be completed by a node.

With reference to the fifth aspect, in a first possible implementation manner of the fifth aspect, the processor is further configured to acquire the topology information of the transport network and the atomic behavior that is supported by each node in the transport network.

With reference to the first possible implementation manner of the fifth aspect, in a second possible implementation manner of the fifth aspect, the processor is specifically configured to receive the topology information of the transport network and the atomic behavior that is supported by each node in the transport network that are input by a user; or acquire, by using a control channel established with each node in the transport network, the topology information of the transport network and the atomic behavior that is supported by each node in the transport network.

With reference to the second possible implementation manner of the fifth aspect, in a third possible implementation manner of the fifth aspect, the processor is specifically configured to establish the control channel to each node in the transport network, and collect the topology information of the transport network by using the control channel; and the receiver is further configured to receive, by using the control channel, the atomic behavior that is supported and sent by each node in the transport network.

With reference to the fifth aspect to the third possible implementation manner of the fifth aspect, in a fourth possible implementation manner of the fifth aspect, the processor is specifically configured to invoke a control plug-in according to the control request message, where the control plug-in is used to calculate, according to the topology information of the transport network, the at least one node that the path passes through; and determine, according to the atomic behavior that is supported by each node in the transport network, the at least one atomic behavior that the at least one node needs to execute.

With reference to the fifth aspect to the fourth possible implementation manner of the fifth aspect, in a fifth possible implementation manner of the fifth aspect, the processor is further configured to maintain the control plug-in that is installed by using a control plug-in interface.

With reference to the fifth aspect to the fifth possible implementation manner of the fifth aspect, in a sixth possible implementation manner of the fifth aspect, the receiver is specifically configured to receive a control request message of a path that is configured by a network manager; or receive a control request message of a path that is driven by an application layer; or receive a control request message of a path that is driven by a transport network.

With reference to the fifth aspect to the sixth possible implementation manner of the fifth aspect, in a seventh possible implementation manner of the fifth aspect, the control request message of the path includes:

an establishment request message of the path, a modification request message of the path, a deletion request message of the path, or a rerouting request message of the path.

With reference to the fifth aspect to the seventh possible implementation manner of the fifth aspect, in an eighth possible implementation manner of the fifth aspect, the transmitter is specifically configured to send a message that includes a configurable location and configurable content of the atomic behavior to the at least one node correspondingly, so that each node configures the transport plane according to the configurable location and the configurable content of the atomic behavior.

With reference to the fifth aspect to the eighth possible implementation manner of the fifth aspect, in a ninth possible implementation manner of the fifth aspect, the path configuration message is an OF message or an XML message.

With reference to the fifth aspect to the ninth possible implementation manner of the fifth aspect, in a tenth possible implementation manner of the fifth aspect, the transport network includes any one of the following:

an SDH, an SONET, an OTN, and WDM.

According to a sixth aspect, an embodiment of the present invention provides a node, including:

a receiver, configured to receive a path configuration message that is sent by a controller and includes an atomic behavior; and a processor, configured to configure a transport plane according to the path configuration message, and execute the atomic behavior included in the message.

With reference to the sixth aspect, in a first possible implementation manner of the sixth aspect, the node further includes:

a transmitter, configured to send a supported atomic behavior to the controller by using a control channel between the node and the controller.

According to the embodiments of the present invention, after receiving a control request of a path, a controller determines, according to topology information of a transport network and an atomic behavior that is supported by each node in the transport network, at least one node that the path passes through in the transport network and at least one atomic behavior that the at least one node needs to execute; and sends a path configuration message that includes the atomic behavior to the at least one node, so that each node configures a transport plane to execute the atomic behavior included in the message. Therefore, when the transport network needs to be extended to support a new control function, it only needs to instruct a node included in the path to execute a corresponding atomic behavior. In this way, without a need of upgrading each node on a control plane, a new function can be rapidly implemented and an upgrading risk can be reduced.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
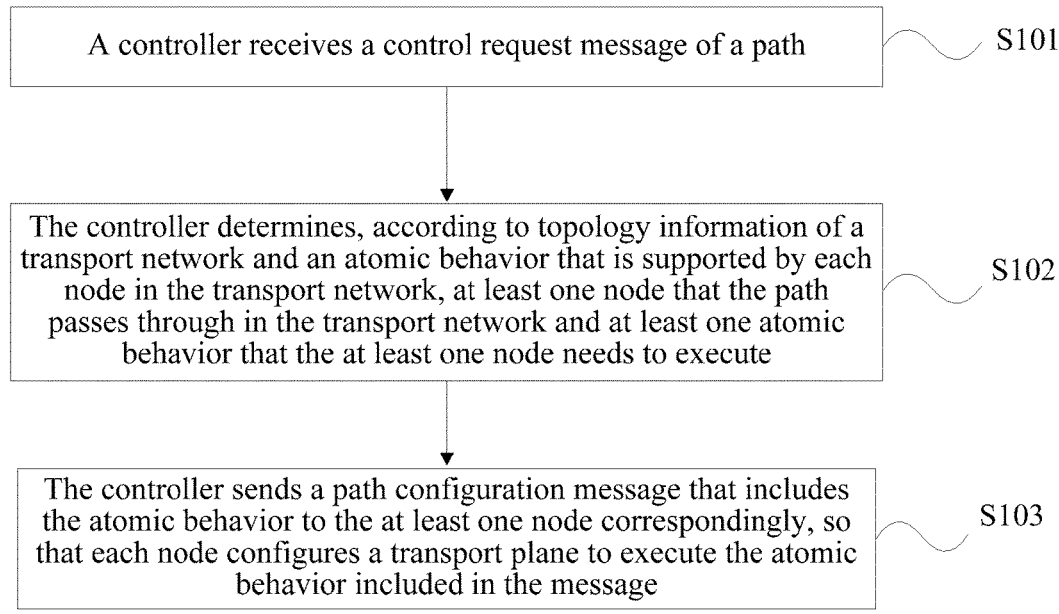
FIG. 1 is a schematic flowchart of a transport network control method according to Embodiment 1 of the present invention.

FIG. 1 is a schematic flowchart of a transport network control method according to Embodiment 1 of the present invention. As shown in FIG. 1, the method includes:

S101: A controller receives a control request message of a path. Specifically, the control request message of the path is used to request different transport functions, which may be, but is not limited to, an establishment request message of the path, a modification request message of the path, a deletion request message of the path, or a rerouting request message of the path, where the modification request message of the path may be a path bandwidth modification request, an optical power adjustment request of a wavelength path, or the like. Different control request messages correspond to different control plug-ins for subsequently calculating a node on the path. For example, the establishment request message has a corresponding path establishment plug-in, and the deletion request message has a corresponding path deletion plug-in.

S102: The controller determines, according to topology information of a transport network and an atomic behavior that is supported by each node in the transport network, at least one node that the path passes through in the transport network and at least one atomic behavior that the at least one node needs to execute. The controller may calculate, according to a specific algorithm, nodes that the path passes through in the transport network and an atomic behavior that each node needs to execute.

S103: The controller sends a path configuration message that includes the atomic behavior to the at least one node correspondingly, so that each node configures a transport plane to execute the atomic behavior included in the message, to implement a transport function requested in the control request message. The path configuration message may be an openflow (OF) message, that is, an OF protocol is extended, and a flow entry modification message carries an atomic behavior that a node needs to execute; or may be an extensible markup language (XML) message, that is, an XML is used to describe an atomic behavior that a node needs to execute, and a message carrying the atomic behavior that the node needs to execute is sent to the node by using an XML-based protocol.

The atomic behavior is a basic action forming a function that can be completed by a node. For example, a function of a node in a transport network is to transport a client signal in the network. A first node of a service in the transport network needs to encapsulate the client signal, so that the client signal can be transported in the transport network; an intermediate node of the service needs to establish a cross, so that the encapsulated client signal may be transported from an ingress channel specified in an ingress port of the node to an egress channel specified in an egress port of the node; and a last node of the service needs to decapsulate the client signal. In addition, to transport the client signal securely, some nodes further need to monitor and protect the service. Herein, a function of transporting client information in a network is formed by multiple basic actions; for example, the intermediate node establishes the cross in the foregoing, where the cross establishment is an atomic behavior.

According to this embodiment, after receiving a control request of a path, a controller determines, according to topology information of a transport network and an atomic behavior that is supported by each node in the transport network, at least one node that the path passes through in the transport network and at least one atomic behavior that the at least one node needs to execute; and sends a path configuration message that includes the atomic behavior to the at least one node, so that each node configures a transport plane to execute the atomic behavior included in the message. Therefore, when the transport network needs to be extended to support a new control function, it only needs to instruct a node included in the path to execute a corresponding atomic behavior. In this way, a new function can be rapidly implemented and an upgrading risk can be reduced. If the prior art is used, each node in a transport network needs to run a control function of a control plane, and when the transport network needs to be extended to support a new control function, control planes of all nodes in the transport network need to be upgraded; such a process is rather complex, and any fault may cause a failure of a whole upgrading process.

The transport network in this embodiment of the present invention may be any one of: an SDH, a synchronous optical network (SONET), an OTN, WDM, and the like.

Further, before the controller receives the control request message of the path in S101, the controller needs to acquire the topology information of the transport network and the atomic behavior that is supported by each node in the transport network. Specifically, there are two acquiring manners: (1) the controller receives the topology information of the transport network and the atomic behavior that is supported by each node in the transport network that are input by a user; and (2) the controller acquires, by using a control channel established with each node in the transport network, the topology information of the transport network and the atomic behavior that is supported by each node in the transport network. If the foregoing manner (2) is used, specifically, the controller establishes the control channel to each node in the transport network, then collects the topology information of the transport network by using the control channel, and receives, by using the control channel, the atomic behavior that is supported and sent by each node in the transport network. The controller in the transport network may learn a status of an entire network; and by using the control channel, may collect topology information of the entire network and receive an atomic behavior that is supported and reported actively by each node. The controller maintains the information. If atomic behaviors supported by all nodes in the transport network are the same, the controller may maintain only one atomic behavior list; or if atomic behaviors supported by all nodes in the transport network are different, the controller further needs to maintain, in addition to an atomic behavior list, a correspondence between each node and an atomic behavior, that is, a correspondence showing which atomic behaviors are supported by a node.

It should be noted that in this embodiment of the present invention, the atomic behavior may include: a configurable location and configurable content of the atomic behavior. For example, in an "SDH cross" atomic behavior, configurable locations are an ingress port of a node and an ingress SDH label, and an egress port of a node and an egress SDH label; and configurable content is to establish or remove unidirectional or bidirectional SDH-type cross-connection. Then, the controller sends the message that includes the atomic behavior to the at least one node correspondingly, so that each node executes the atomic behavior included in the message to configure the transport plane, which is specifically as follows: the controller sends a message that includes the configurable location and the configurable content of the atomic behavior to the at least one node correspondingly, so that each node configures the transport plane according to the configurable location and the configurable content of the atomic behavior. After each node completes configuration, content in the atomic behavior may be executed.

Figure 2:
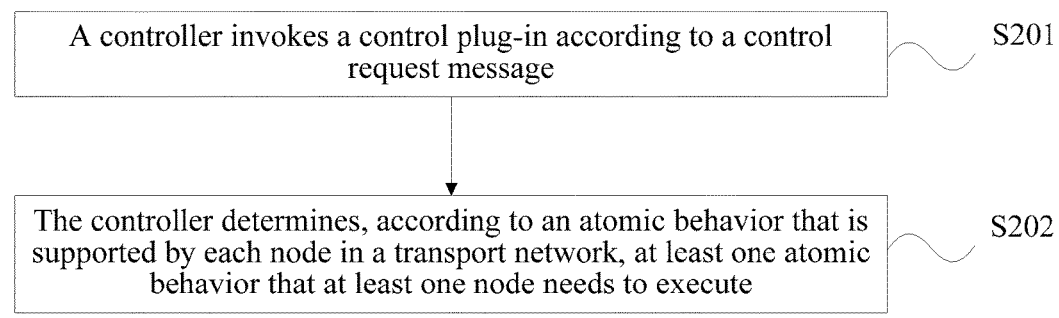
FIG. 2 is a schematic flowchart of a transport network control method according to Embodiment 2 the present invention.

FIG. 2 is a schematic flowchart of Embodiment 2 of a transport network control method according to Embodiment 2 of the present invention. As shown in FIG. 2, the controller determines, according to the topology information of the transport network and the atomic behavior that is supported by each node in the transport network, the at least one node that the path passes through in the transport network and the at least one atomic behavior that the at least one node needs to execute in S102, which is specifically as follows:

S201: The controller invokes a control plug-in according to the control request message, where the control plug-in is used to calculate, according to the topology information of the transport network, the at least one node that the path passes through.

After receiving the control request message of the path, the controller acquires a requirement from the control request message, and invokes a control plug-in according to the requirement. For example, when the request message received by the controller requests to establish an N+R mixed protection and restoration control function, the controller invokes, according to the request, a control plug-in that has the N+R mixed protection and restoration control function. The N+R mixed protection and restoration control function specifically is that: for one service, when the service fails for the first time to the $n^{th}$ time, 1+1 protection is enabled for the service; when the service fails for the (N+1)$^{th}$ time to the (N+R)$^{th}$ time, rerouting recovery is enabled for the service; and when the service fails for the (N+R+1)$^{th}$ time, protection and restoration is not performed on the service.

S202: The controller determines, according to the atomic behavior that is supported by each node in the transport network, the at least one atomic behavior that the at least one node needs to execute.

Before S201, the controller maintains the control plug-in that is installed by using a control plug-in interface. Specifically, in this embodiment, the control plug-in is installed in advance in the controller. The controller is disposed with a control plug-in installation interface. When the transport network needs to support a new control function, a related control plug-in is installed by using the control plug-in installation interface in the controller, and the control plug-in is maintained by the controller. After the control request message is received, a corresponding control plug-in is selected and invoked to perform a related operation.

By using this embodiment of the present invention, in a transport network, a function completed by a node is indicated as multiple atomic behaviors. Therefore, when a new control plug-in is designed to implement a new control function of a path, an atomic behavior of a node on the path does not need to be changed, but only existing atomic behaviors needs to be re-combined.

It should be noted that, that the controller receives the control request message of the path in S101 may include the following three cases: (1) the controller receives a control request message of a path that is configured by a network manager, that is, receives a command of the network manager; (2) the controller receives a control request message of a path that is driven by an application layer, that is, the controller receives a service drive of an upper-layer application layer, for example, a data center controller drives a transport network controller to execute a path establishment command, so that the transport network bears data migration between data centers; and (3) the controller receives a control request message of a path that is driven by a transport network, that is, receives a service drive of a lower-layer transport network of the controller, for example, a network layer link failure triggers a transport network controller to execute a rerouting request.

Figure 3A:
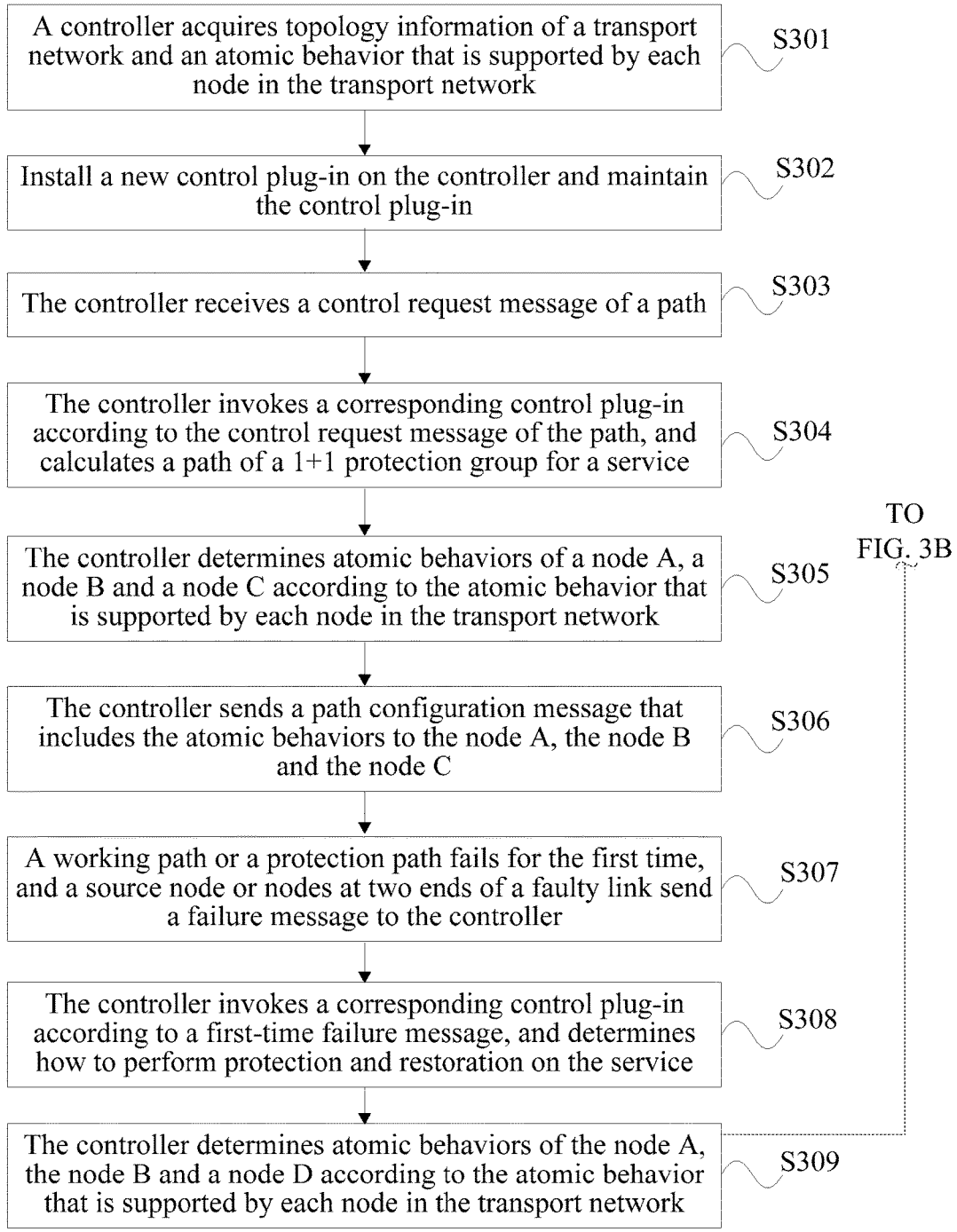
FIG. 3A and FIG. 3B are a schematic flowchart of a transport network control method according to Embodiment 3 of the present invention.
Figure 3B:
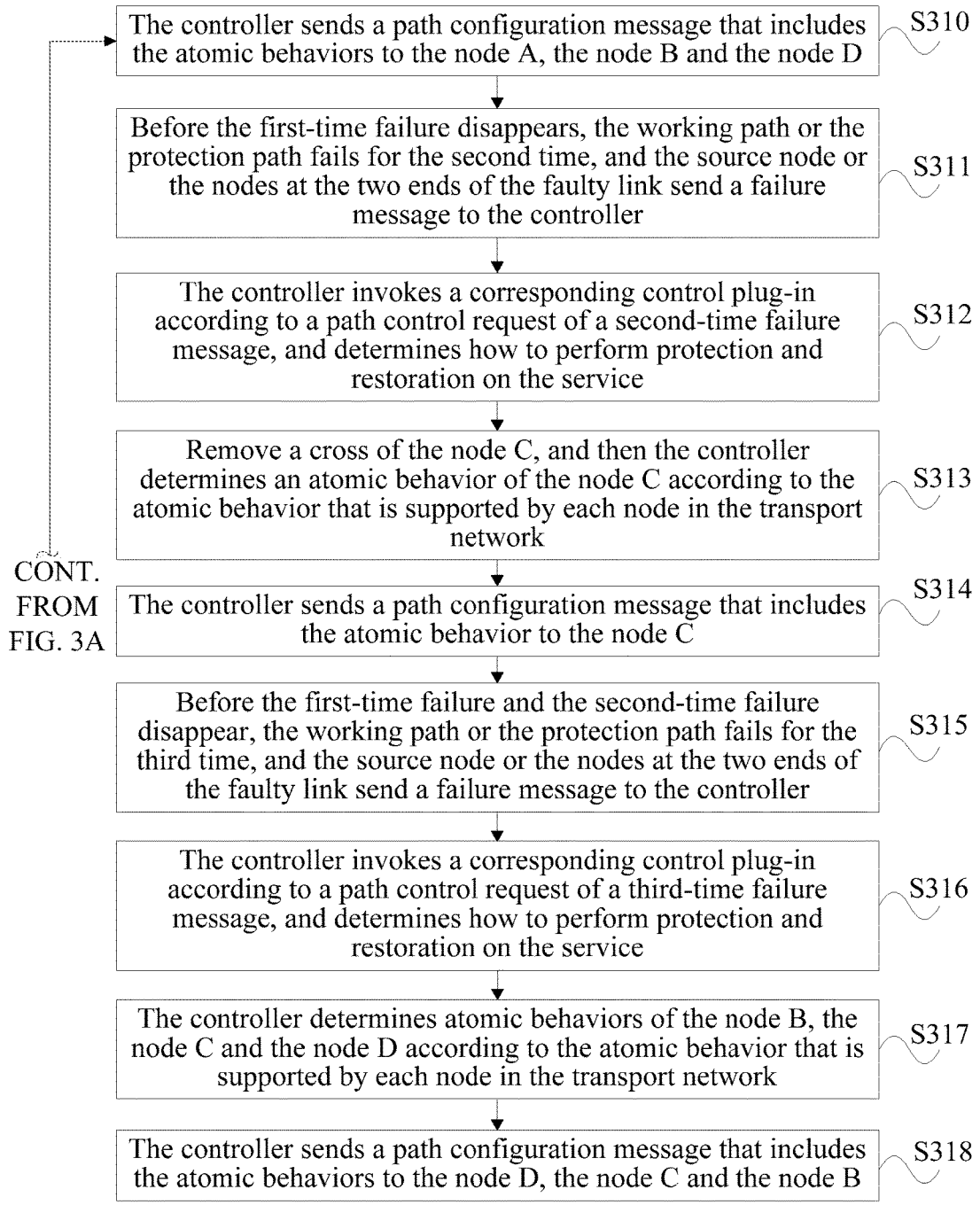
Figure 4:
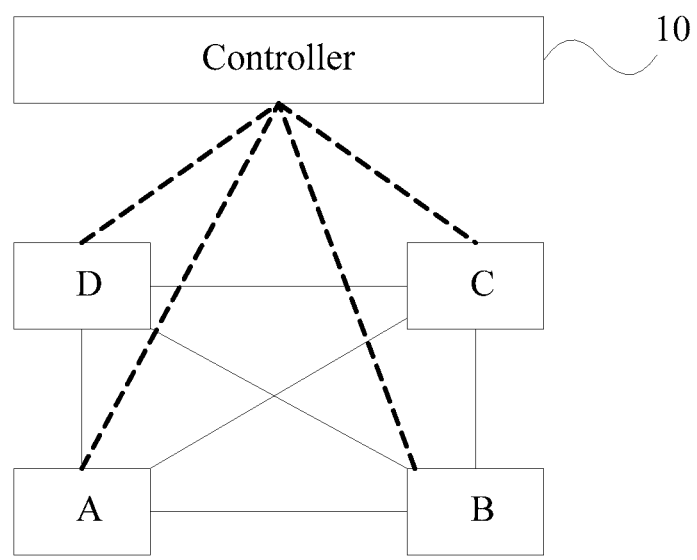
FIG. 4 is a scenario diagram of the method embodiment shown in FIG. 3A and FIG. 3B.

FIG. 3A and FIG. 3B are a schematic flowchart of a transport network control method according to of Embodiment 3 the present invention; and FIG. 4 is a scenario diagram of the method embodiment shown in FIG. 3A and FIG. 3B, which describes the foregoing method embodiment by using an example. By using an OTN transport network as an example, it is assumed that atomic behaviors supported by each node in the OTN transport network include: (1) an Optical Channel Data Unit (ODU) cross; (2) 1+1 protection-source end; and (3) 1+1 protection-sink end; and it is assumed that the OTN transport network needs to be upgraded to enable the OTN transport network to support the N+R mixed protection and restoration control function, where N and R are integers greater than or equal to 1.

Referring to FIG. 4, a controller 10 is included. The controller 10 is a transport network controller. That there are four nodes: a node A, a node B, a node C, and a node D is used as an example, where a dashed line represents a control channel, which is established by the controller 10, between the controller and each node, and a solid line represents a link between nodes, and the node A is a source node.

As shown in FIG. 3A and FIG. 3B, the method includes:

S301: A controller acquires topology information of a transport network and an atomic behavior that is supported by each node in the transport network. For a specific acquiring process, reference may be made to the foregoing method embodiment, and details are not provided herein again.

S302: Install a new control plug-in on the controller and maintain the control plug-in. In this example, the installed control plug-in supports the foregoing N+R mixed protection and restoration control function.

S303: The controller receives a control request message of a path. In this example, it is assumed that the control request message is a command sent by a network manager and is used to indicate that the service needs N+R mixed protection and restoration, and it is assumed that N=2, and R=1.

S304: The controller invokes a corresponding control plug-in according to the control request message of the path, and calculates a path of a 1+1 protection group for the service. Specifically, the control plug-in installed in S302 is invoked. Referring to FIG. 4, it is assumed that a calculated working path is "the node A to the node B" and a protection path is "the node A to the node C to the node B".

S305: The controller determines atomic behaviors of the node A, the node B and the node C according to the atomic behavior that is supported by each node in the transport network, that is, needs to configure nodes that the working path and the protection path pass through. In this example, the atomic behavior that the node A needs to execute includes: (1) a "1+1 protection-source end" atomic behavior, where configurable locations are: an ingress port of a node, an egress port and an egress ODU label that correspond to a node working path, and an egress port and an egress ODU label that correspond to a node protection path; and configurable content is to establish a 1+1 double transmitting cross. The atomic behavior that the node B needs to execute includes: (1) a "1+1 protection-sink end" atomic behavior, where configurable locations are: an ingress port and an ingress ODU label that correspond to a node working path, an ingress port and an ingress ODU label that correspond to a node protection path, and an egress port of a node; and configurable content is to establish a 1+1 selective-receiving cross.

S306: The controller sends a path configuration message that includes the atomic behaviors to the node A, the node B and the node C, so that the node A, the node B and the node C configure transport planes to execute the atomic behaviors included in the foregoing message, that is, the atomic behavior configured for each of the node A, the node B and the node C in S305. The transport plane is a plane in which each node in the transport network is located.

S307: The working path or the protection path fails for the first time, and a source node or nodes at two ends of a faulty link send a first-time failure message to the controller, where the failure message is equivalent to the foregoing control request message. In this example, it is assumed that the working path fails, and specifically, it is assumed that "the node A to the node B" fails, where the node A sends a failure message to the controller, which belongs to the foregoing control request message of the path that is driven by the transport network.

S308: The controller invokes a control plug-in according to the first-time failure message, and determines how to perform protection and restoration on the service. Specifically, the control plug-in installed in S302 is invoked. Because this is the first-time failure, 1+1 protection is performed on the service according to the "N+R mixed protection and restoration control function", the service is switched to the protection path "the node A to the node C to the node B", and the protection path changes to a new working path; in addition, in order that 1+1 protection can still be performed on the service when a next failure (N=2) occurs, a new protection path "the node A to the node D to the node B" needs to be established, to form 1+1 protection with the original protection path again, and the new protection path may be calculated by the control plug-in. Optionally, the transport network controller may remove the faulty working path.

S309: The controller determines atomic behaviors of the node A, the node B and the node D according to the atomic behavior that is supported by each node in the transport network, where the node C does not change, and the atomic behavior of the node C does not need to be determined. In this case, the atomic behaviors that the node A needs to execute include: (1) a "1+1 protection-source end" atomic behavior, where configurable locations are: an ingress port of a node, an egress port and an egress ODU label that correspond to an original node working path (the node A to the node B), and an egress port and an egress ODU label that correspond to an original node protection path (the node A to the node C to the node B, that is, the new working path); and configurable content is to remove the 1+1 double transmitting cross; (2) a "1+1 protection-source end" atomic behavior, where configurable locations are: an ingress port of a node, an egress port and an egress ODU label that correspond to a new node working path (the node A to the node C to the node B, that is, the original protection path), and an egress port and an egress ODU label that correspond to a new node protection path (the node A to the node D to the node B); and configurable content is to establish a 1+1 double transmitting cross. The atomic behaviors that the node B needs to execute include: (1) a "1+1 protection-source end" atomic behavior, where configurable locations are: an egress port of a node, an ingress port and an ingress ODU label that correspond to the original node working path (A to B), and an ingress port and an ingress ODU label that correspond to the original node protection path (the node A to the node C to the node B, that is, the new working path); and configurable content is to remove the 1+1 selective-receiving cross; (2) a "1+1 protection-source end" atomic behavior, where configurable locations are: an egress port of a node, an ingress port and an ingress ODU label that correspond to the new node working path (the node A to the node C to the node B, that is, the original protection path), and an ingress port and an ingress ODU label that correspond to the new node protection path (the node A to the node D to the node B); and configurable content is to establish a 1+1 selective-receiving cross. The atomic behavior that the node D needs to execute includes: (1) an "ODU cross" atomic behavior, where configurable locations are: an ingress port and an ingress ODU label that correspond to the new node protection path (the node A to the node D to the node B), and an egress port and an egress ODU label that correspond to the new node protection path (the node A to the node D to the node B); and configurable content is to establish an ODU-type cross-connection.

S310: The controller sends a path configuration message that includes the atomic behaviors to the node A, the node B and the node D, so that the node A, the node B and the node D configure transport planes to execute the atomic behaviors included in the foregoing message, that is, the atomic behavior configured for each of the node A, the node B and the node D in S309.

S311: Before the first-time failure disappears, the working path or the protection path fails for the second time, and the source node or the nodes at the two ends of the faulty link send a second-time failure message to the controller, where the failure message is equivalent to the foregoing control request message. In this example, it is assumed that the working path fails, and specifically, it is assumed that "the node A to the node C" fails, where the node A sends a failure message to the controller, which belongs to the foregoing control request message of the path that is driven by the transport network.

S312: The controller invokes a control plug-in according to the second-time failure message, and determines how to perform protection and restoration on the service. Specifically, the control plug-in installed in S302 is invoked, and in this example, N=2, and R=1. Because this is the second-time failure, 1+1 protection is performed on the service according to the "N+R mixed protection and restoration control function", the service is switched to the protection path "the node A to the node D to the node B", and the protection path changes to a new working path. Because when a next failure (N+R=3) occurs, only rerouting needs to be started to perform restoration, and in this case, a protection path does not need to be established in advance for the next failure. Optionally, the transport network controller may remove the faulty working path.

S313: Remove a cross of the node C, and then the controller determines an atomic behavior of the node C according to the atomic behavior that is supported by each node in the transport network. In this case, the atomic behavior that the node C needs to execute includes: (1) an "ODU cross" atomic behavior, where configurable locations are: an ingress ODU label that corresponds to the original node working path (the node A to the node C to the node B), and an egress port and an egress ODU label that correspond to the original node working path (the node A to the node C to the node B); and configurable content is to remove the ODU-type cross-connection. If the cross of the node C is not removed, the node C does not need to execute the atomic behavior.

It should be noted that, S313 is optional, if S313 is performed, perform S314; if S313 is not performed, perform S315 directly after S312 is completed.

S314: The controller sends a path configuration message that includes the atomic behavior to the node C, so that the node C configures a transport plane to execute the atomic behavior included in the message, that is, the atomic behavior configured for the node C in S313. If the node C does not need to perform the corresponding atomic behavior in S313, the path configuration message does not need to send to the node C.

S315: Before the first-time failure and the second-time failure disappear, the working path or the protection path fails for the third time, and the source node or the nodes at the two ends of the faulty link send a third-time failure message to the controller, where the failure message is equivalent to the foregoing control request message. In this example, it is assumed that the working path fails, and specifically, it is assumed that "the node D to the node B" fails, where the node A or the node D sends a failure message to the controller, which belongs to the foregoing control request message of the path that is driven by the transport network.

S316: The controller invokes a corresponding control plug-in according to the third-time failure message, and determines how to perform protection and restoration on the service. Specifically, the control plug-in installed in S302 is invoked, and in this example, N=2, and R=1. Because this is the third-time failure, rerouting restoration is performed on the service according to the "N+R mixed protection and restoration control function". The invoked control plug-in calculates a new working path "the node A to the node D to the node C to the node B" for the service. Optionally, the transport network controller may remove the faulty working path.

S317: The controller determines atomic behaviors of the node B, the node C and the node D according to the atomic behavior that is supported by each node in the transport network. The atomic behaviors that the node D needs to execute include: (1) an "ODU cross" atomic behavior, where configurable locations are: an ingress port and an ingress ODU label that correspond to the original node working path (the node A to the node D to the node B), and an egress port and an egress ODU label that correspond to the original node working path (the node A to the node D to the node B); and configurable content is to remove the ODU-type cross-connection; and (2) an "ODU cross" atomic behavior, where configurable locations are: an ingress port and an ingress ODU label that correspond to the new node working path (the node A to the node D to the node C to the node B), and an egress port and an egress ODU label that correspond to the new node working path (the node A to the node D to the node C to the node B); and configurable content is to establish an ODU-type cross-connection. The atomic behavior that the node C needs to execute includes: (1) an "ODU cross" atomic behavior, where configurable locations are: an ingress port and an ingress ODU label that correspond to the new node working path (the node A to the node D to the node C to the node B), and an egress port and an egress ODU label that correspond to the new node working path (the node A to the node D to the node C to the node B); and configurable content is to establish an ODU-type cross-connection. The atomic behaviors that the node B needs to execute include: (1) an "ODU cross" atomic behavior, where configurable locations are: an ingress port and an ingress ODU label that correspond to the original node working path (the node A to the node D to the node B), and an egress port of a node; and configurable content is to remove the ODU-type cross-connection; and (2) an "ODU cross" atomic behavior, where configurable locations are: an ingress port and an ingress ODU label that correspond to the new node working path (the node A to the node D to the node C to the node B), and an egress port of a node; and configurable content is to establish an ODU-type cross-connection.

S318: The controller sends a path configuration message that includes the atomic behaviors to the node D, the node C and the node B, so that the node D, the node C and the node B configure transport planes to execute the atomic behaviors included in the foregoing message, that is, the atomic behavior configured for each of the node D, the node C and the node B in S317.

Figure 5:
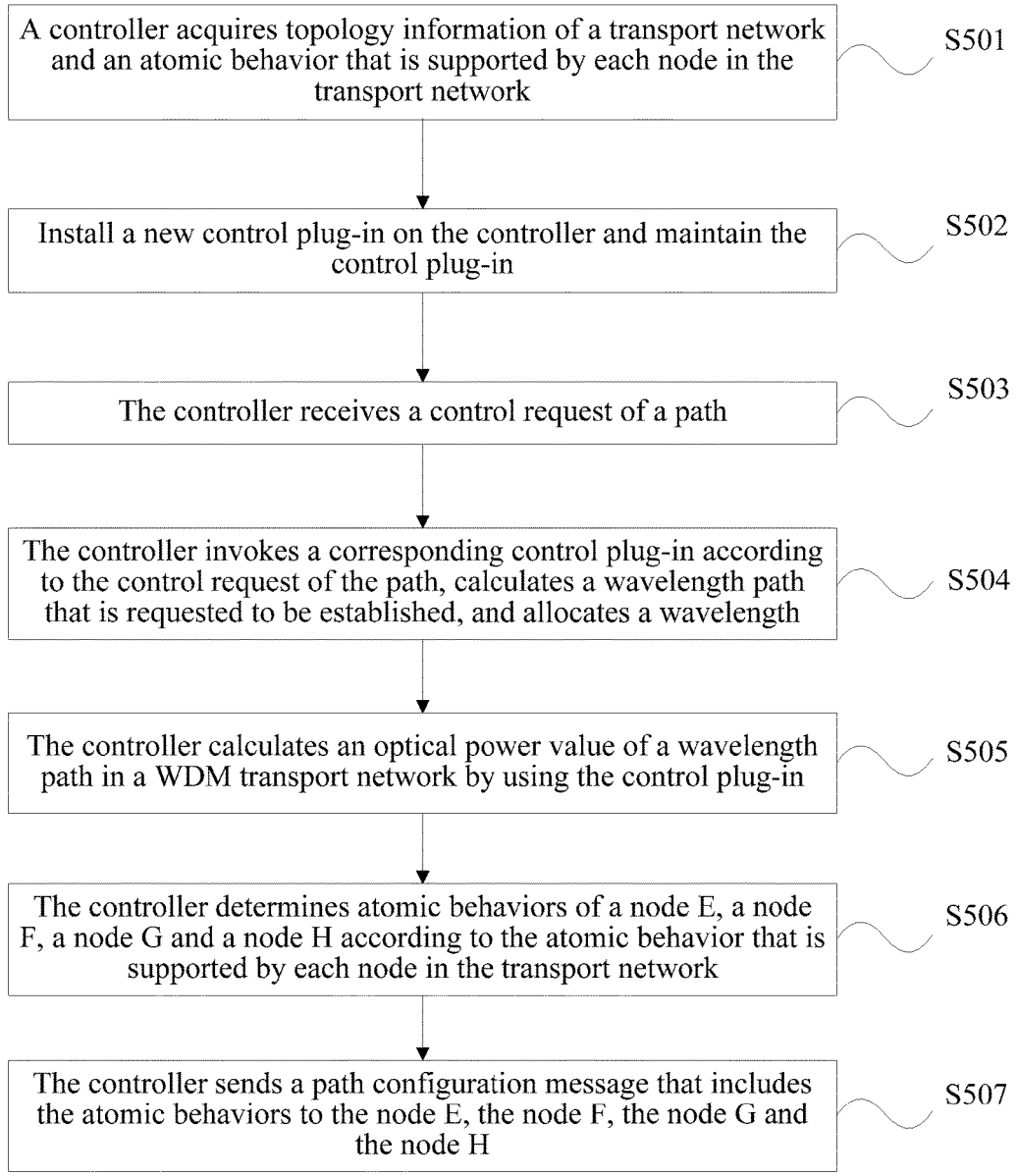
FIG. 5 is a schematic flowchart of a transport network control method according to Embodiment 5 of the present invention.
Figure 6:
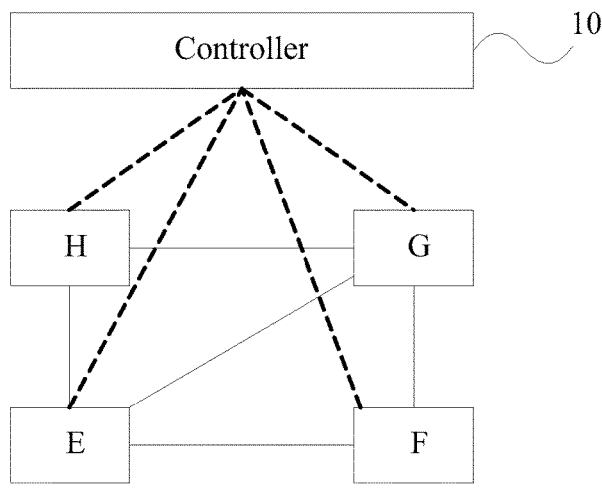
FIG. 6 is a scenario diagram of the method embodiment shown in FIG. 5.

FIG. 5 is a schematic flowchart of a transport network control method according to Embodiment 5 of the present invention; and FIG. 6 is a scenario diagram of the method embodiment shown in FIG. 5, which describes the foregoing method embodiment by using an example. By using a WDM transport network as an example, it is assumed that atomic behaviors supported by each node in the WDM transport network include: (1) a wavelength cross; and (2) optical power adjustment, where it is assumed herein that in an original WDM transport network, data needs to be monitored according to actual optical power to commission a wavelength path in the WDM transport network in a detecting manner, until wavelengths in links achieve equilibrium to a certain degree. Currently, the WDM transport network needs to be upgraded, so that the WDM transport network can directly calculate an optical power value of each wavelength path according to a damage model of each node.

Referring to FIG. 6, a controller 10 is included. The controller 10 is a transport network controller. That there are four nodes: a node E, a node F, a node G, and a node H is used as an example, where a dashed line represents a control channel, which is established by the controller 10, between the controller and each node, and a solid line represents a link between nodes, and the node A is a source node. In this example, it is assumed that a wavelength path "the node E to the node F to the node G" has already existed in the WDM transport network, which uses a wavelength of 1, and light-emitting power of a $\lambda 1$ upper wave port on the node E of the wavelength path is P1 (because there is damage in the WDM network, at the node F and the node G, optical power of $\lambda 1$ has changed, and is not equal to P1).

As shown in FIG. 5, the method includes:

S501: A controller acquires topology information of a transport network and an atomic behavior that is supported by each node in the transport network. For a specific acquiring process, reference may be made to the foregoing method embodiment, and details are not provided herein again.

S502: Install a new control plug-in on the controller and maintain the control plug-in. In this example, the installed control plug-in may calculate a proper optical power value for a wavelength path according to a damage model of each node in the WDM transport network.

S503: The controller receives a control request of a path, where the control request of the path indicates establishment of a wavelength path between the node F and the node H.

S504: The controller invokes a corresponding control plug-in according to the control request of the path, calculates the wavelength path that is requested to be established, and allocates a wavelength. It is assumed that a calculation result is "the node F to the node G to the node H", and the wavelength is $\lambda 2$.

S505: The controller calculates an optical power value of a wavelength path in the WDM transport network by using the control plug-in. In this example, because the existing wavelength path "the node E to the node F to the node G" and the wavelength path "the node F to the node G to the node H" that is requested to be established pass through a same link "the node F to the node G", optical power equilibrium of two wavelengths on the link "the node F to the node G" needs to be considered. It is assumed that a result of the optical power that is calculated by the controller according to the damage model of each node is as follows: light-emitting power of the new wavelength path "the node F to the node G to the node H" at a $\lambda 2$ upper wave port on the first node F is P2, and the light-emitting power of the original wavelength path "the node E to the node F to the node G" at the $\lambda 1$ upper wave port on the first node E is adjusted to P3.

It should be noted that S504 and S505 may be performed simultaneously.

S506: The controller determines atomic behaviors of the node E, the node F, the node G and the node H according to the atomic behavior that is supported by each node in the transport network, that is, needs to configure nodes that a working path and a protection path pass through. In this example, the atomic behavior that the node E needs to execute includes: (1) an "optical power adjustment" atomic behavior, where a configurable location is: the $\lambda 1$ upper wave port on the node E of the original wavelength path "the node E to the node F to the node G"; and configurable content is to adjust the light-emitting power to P3. The atomic behaviors that the node F needs to execute include: (1) a "wavelength cross" atomic behavior, where a configurable location is: the λ2 upper wave port on the node F of the new wavelength path "the node F to the node G to the node H"; and configurable content is to establish a wavelength-type cross-connection; and (2) an "optical power adjustment" atomic behavior, where a configurable location is: the λ2 upper wave port on the node F of the new wavelength path "the node F to the node G to the node H"; and configurable content is to adjust the light-emitting power to P2. The atomic behavior that the node G needs to execute includes: (1) a "wavelength cross" atomic behavior, where configurable locations are: an ingress port and an ingress wavelength λ2 that correspond to the new wavelength path "the node F to the node G to the node H", and an egress port and an egress wavelength λ2 that correspond to the path; and configurable content is to establish a wavelength-type cross-connection. The atomic behavior that the node H needs to execute includes: (1) a "wavelength cross" atomic behavior, where configurable locations are: an ingress port and an ingress wavelength λ2 that correspond to the new wavelength path "the node F to the node G to the node H", and a λ2 lower wave port on the node H of the path; and configurable content is to establish a wavelength-type cross-connection.

S507: The controller sends a path configuration message that includes the atomic behaviors to the node E, the node F, the node G and the node H, so that the node E, the node F, the node G and the node H configure transport planes to execute the atomic behaviors included in the message, that is, the atomic behavior configured for each of the node E, the node F, the node G and the node H in S506. The transport plane is a plane in which each node in the transport network is located.

In this embodiment, a complete function is decomposed into multiple atomic behaviors. When a transport network needs to be extended to support a new control function, it only needs to invoke a pre-installed corresponding control plug-in. Nodes that a path passes through are calculated by using the control plug-in, and then a controller determines, according to an atomic behavior that is supported by each node in the transport network, atomic behaviors that the nodes that the path passes through need to execute, and instructs the nodes to execute corresponding atomic behaviors. There is no need for the atomic behavior of each node, but it only needs to re-combine the atomic behaviors supported by the nodes. In this way, a new function can be rapidly implemented and an upgrading risk can be reduced.

Figure 7:
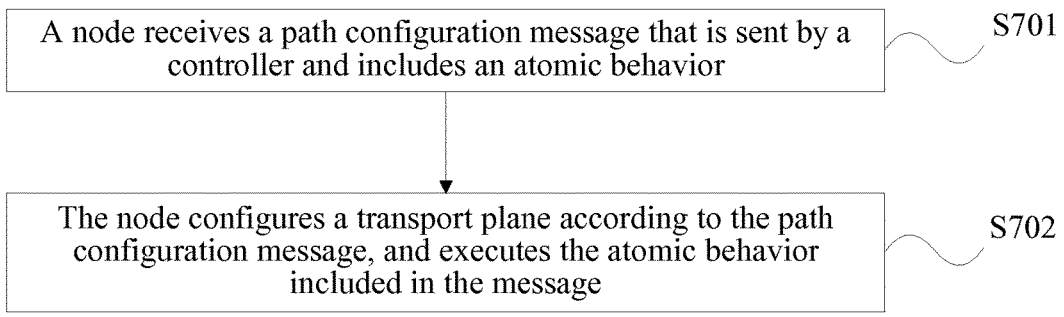
FIG. 7 is a schematic flowchart of a transport network control method according to Embodiment 7 of the present invention.

FIG. 7 is a schematic flowchart of a transport network control method according to of Embodiment 7 the present invention. The method may be executed by any node in nodes that a path determined by the foregoing controller passes through, and the method includes:

S701: A node receives a path configuration message that is sent by a controller and includes an atomic behavior. The controller invokes a corresponding control plug-in according to a control request message of a path, and calculates nodes that the path passes through; and the controller determines atomic behaviors that the nodes need to execute, uses the path configuration message to carry an atomic behavior that a node needs to execute, and sends the path configuration message to the corresponding node.

S702: The node configures a transport plane according to the path configuration message, and executes the atomic behavior included in the message. A plane in which the node is located is the transport plane. After receiving the path configuration message, the node completes its own configuration, that is, may execute the atomic behavior in the message.

Further, if the controller automatically acquires an atomic behavior that is supported by each node in the transport network, before S701, the node sends a supported atomic behavior to the controller by using a control channel between the node and the controller.

In this embodiment, a node receives a path configuration message that is sent by a controller and includes an atomic behavior, and executes the atomic behavior in the message. In this way, in an upgrading process of a transport network, a determined node in a path only needs to re-combine, according to an instruction, atomic behaviors supported by the node, and other functions of the node do not need to be changed. For example, when a function is implemented, the node completes an atomic behavior, that is, encapsulation, and in another function, the node completes an atomic behavior, that is, decapsulation. The node originally supports the two atomic behaviors: encapsulation and decapsulation. By using this embodiment of the present invention, it only needs to instruct the node to execute which atomic behavior. However, if the prior art is used, it needs to re-configure an entire function of the node.

Figure 8:
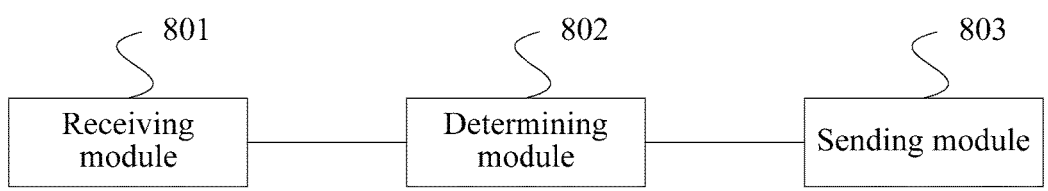
FIG. 8 is a schematic structural diagram of a controller according to Embodiment 1 of the present invention.

FIG. 8 is a schematic structural diagram of a controller according to Embodiment 1 of the present invention. As shown in FIG. 8, the controller includes: a receiving module 801, a determining module 802, and a sending module 803.

The receiving module 801 is configured to receive a control request message of a path; the determining module 802 is configured to determine, according to topology information of a transport network and an atomic behavior that is supported by each node in the transport network, at least one node that the path passes through in the transport network and at least one atomic behavior that the at least one node needs to execute; and the sending module 803 is configured to send a path configuration message that includes the atomic behavior to the at least one node correspondingly, so that each node configures a transport plane to execute the atomic behavior included in the message, to implement a transport function requested in the control request message; where the atomic behavior is a basic action forming a function that can be completed by a node.

The foregoing modules may execute the foregoing method embodiments. Implementation principles thereof are similar, and details are not provided herein again.

In this embodiment, after receiving a control request of a path, a controller determines, according to topology information of a transport network and an atomic behavior that is supported by each node in the transport network, at least one node that the path passes through in the transport network and at least one atomic behavior that the at least one node needs to execute; and sends a path configuration message that includes the atomic behavior to the at least one node, so that each node configures a transport plane to execute the atomic behavior included in the message. Therefore, when the transport network needs to be extended to support a new control function, it only needs to instruct a node included in the path to execute a corresponding atomic behavior. In this way, a new function can be rapidly implemented and an upgrading risk can be reduced.

Figure 9:
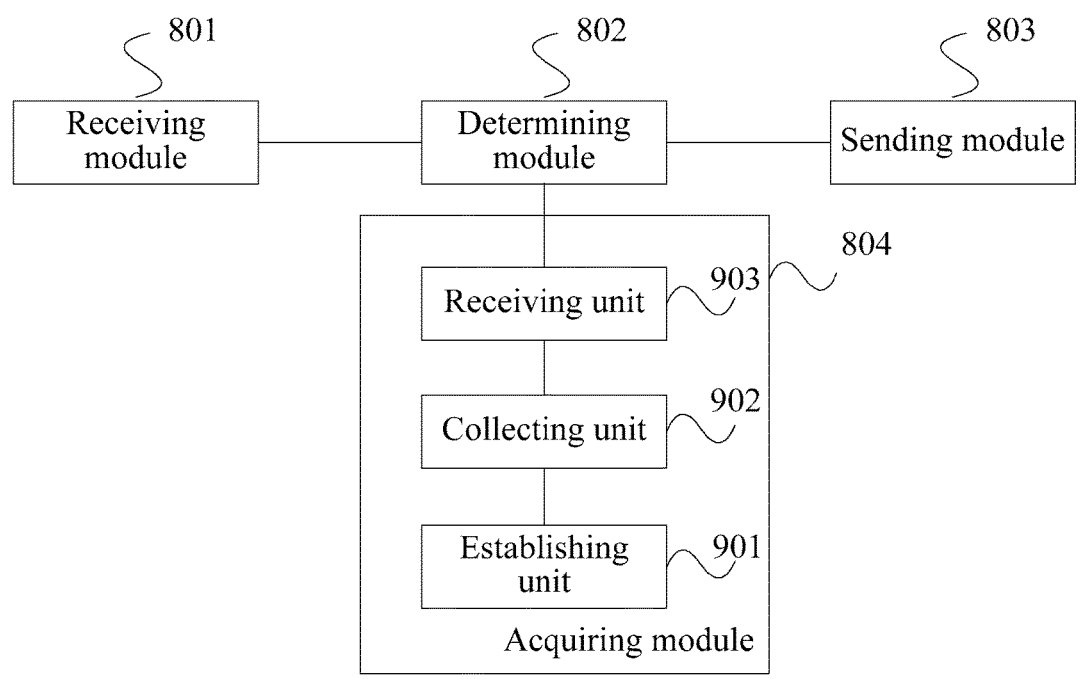
FIG. 9 is a schematic structural diagram of a controller according to Embodiment 2 of the present invention.

FIG. 9 is a schematic structural diagram of a controller according to Embodiment 2 of the present invention. As shown in FIG. 9, on the basis of FIG. 8, the controller further includes: an acquiring module 804, configured to acquire the topology information of the transport network and the atomic behavior that is supported by each node in the transport network.

Further, the acquiring module 804 is specifically configured to receive the topology information of the transport network and the atomic behavior that is supported by each node in the transport network that are input by a user; or acquire, by using a control channel established with each node in the transport network, the topology information of the transport network and the atomic behavior that is supported by each node in the transport network.

Referring to FIG. 9, more specifically, the acquiring module 804 includes: an establishing unit 901, a collecting unit 902, and a receiving unit 903.

The establishing unit 901 is configured to establish the control channel to each node in the transport network; and the collecting unit 902 is configured to collect the topology information of the transport network by using the control channel; and the receiving unit 903 is configured to receive, by using the control channel, the atomic behavior that is supported and sent by each node in the transport network.

The foregoing modules and/or units may execute the foregoing method embodiments. Implementation principles thereof are similar, and details not provided herein again.

Figure 10:
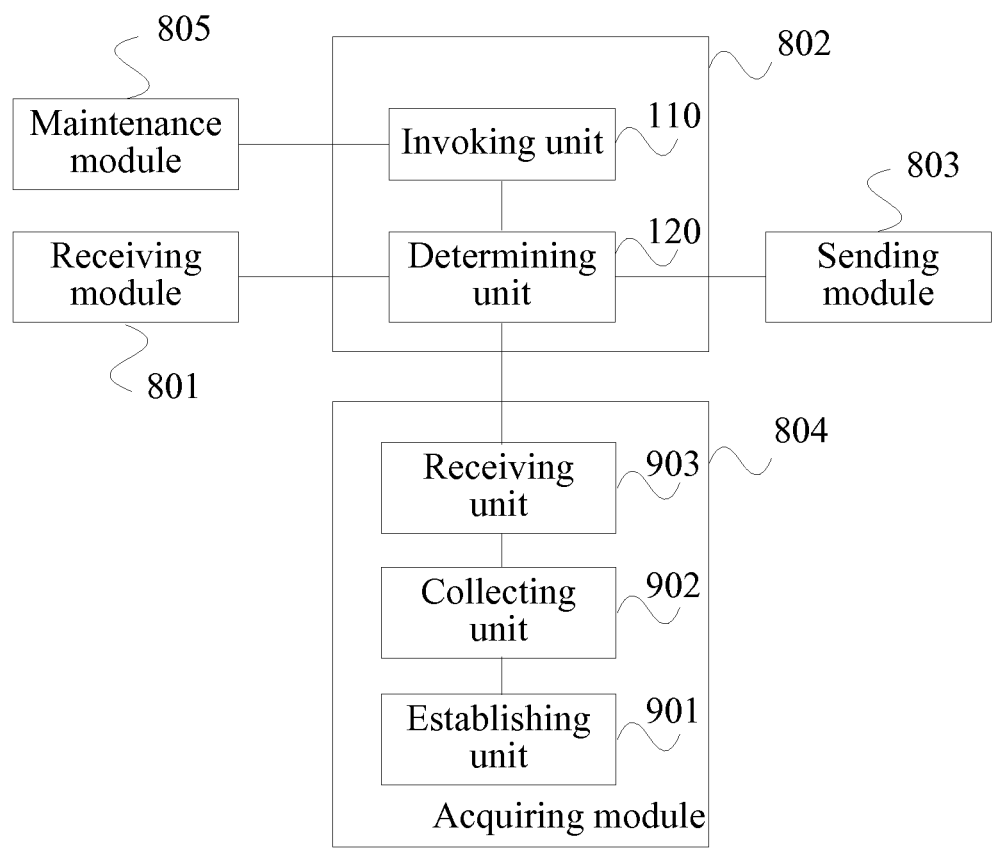
FIG. 10 is a schematic structural diagram of a controller according to Embodiment 3 of the present invention.

FIG. 10 is a schematic structural diagram of a controller according to Embodiment 3 of the present invention. On the basis of FIG. 9, the determining module 802 in the controller includes: an invoking unit 110 and a determining unit 120.

The invoking unit 110 is configured to invoke a control plug-in according to the control request message, where the control plug-in is used to calculate, according to the topology information of the transport network, the at least one node that the path passes through; and the determining unit 120 is configured to determine, according to the atomic behavior that is supported by each node in the transport network, the at least one atomic behavior that the at least one node needs to execute.

Referring to FIG. 10, the controller further includes a maintenance module 805, configured to maintain the control plug-in that is installed by using a control plug-in interface.

Further, the receiving module 801 is specifically configured to receive a control request message of a path that is configured by a network manager; or receive a control request message of a path that is driven by an application layer; or receive a control request message of a path that is driven by a transport network.

The sending module 803 is specifically configured to send a message that includes a configurable location and configurable content of the atomic behavior to the at least one node correspondingly, so that each node configures the transport plane according to the configurable location and the configurable content of the atomic behavior.

It should be noted that in this embodiment, the control request message of the path includes, but is not limited to, an establishment request message of the path, a modification request message of the path, a deletion request message of the path, or a rerouting request message of the path.

The path configuration message is an OF message or an XML message.

The transport network may be any one of the following: an SDH, an SONET, an OTN, WDM, and the like.

The foregoing modules and/or units may execute the foregoing method embodiments. Implementation principles thereof are similar, and details not provided herein again.

Figure 11:
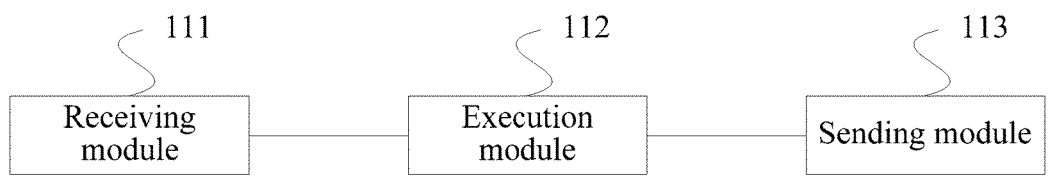
FIG. 11 is a schematic structural diagram of a node according to Embodiment 1 of the present invention.

FIG. 11 is a schematic structural diagram of a node according to Embodiment 1 of the present invention. The node is any node in nodes determined by a controller that a path passes through. As shown in FIG. 11, the node includes: a receiving module 111 and an execution module 112.

The receiving module 111 is configured to receive a path configuration message that is sent by a controller and includes an atomic behavior; and the execution module 112 is configured to configure a transport plane according to the path configuration message, and execute the atomic behavior included in the message.

Further, the node further includes a sending module 113, configured to send a supported atomic behavior to the controller by using a control channel between the node and the controller.

The foregoing modules and/or units may execute the foregoing method embodiments. Implementation principles thereof are similar, and details not provided herein again.

Figure 12:
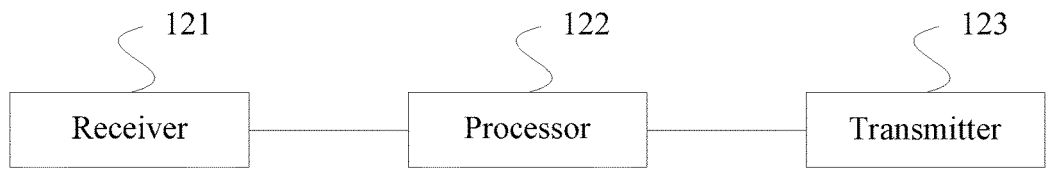
FIG. 12 is a schematic structural diagram of a controller according to Embodiment 4 of the present invention.

FIG. 12 is a schematic structural diagram of a controller according to Embodiment 4 of the present invention. As shown in FIG. 12, the controller includes: a receiver 121, a processor 122, and a transmitter 123.

The receiver 121 is configured to receive a control request message of a path; the processor 122 is configured to determine, according to topology information of a transport network and an atomic behavior that is supported by each node in the transport network, at least one node that the path passes through in the transport network and at least one atomic behavior that the at least one node needs to execute; and the transmitter 123 is configured to send a path configuration message that includes the atomic behavior to the at least one node correspondingly, so that each node configures a transport plane to execute the atomic behavior included in the message, to implement a transport function requested in the control request message; where it should be noted that the atomic behavior is a basic action forming a function that can be completed by a node.

Further, the processor 122 is further configured to acquire the topology information of the transport network and the atomic behavior that is supported by each node in the transport network.

The processor 122 is specifically configured to receive the topology information of the transport network and the atomic behavior that is supported by each node in the transport network that are input by a user; or acquire, by using a control channel established with each node in the transport network, the topology information of the transport network and the atomic behavior that is supported by each node in the transport network.

Further, the processor 122 is specifically configured to establish the control channel to each node in the transport network, and collect the topology information of the transport network by using the control channel; and in this case, the receiver 121 is further configured to receive, by using the control channel, the atomic behavior that is supported and sent by each node in the transport network.

The processor 122 is further specifically configured to invoke a control plug-in according to the control request message, where the control plug-in is used to calculate, according to the topology information of the transport network, the at least one node that the path passes through; and determine, according to the atomic behavior that is supported by each node in the transport network, the at least one atomic behavior that the at least one node needs to execute.

In addition, the processor 122 is further configured to maintain the control plug-in that is installed by using a control plug-in interface.

The receiver 121 is specifically configured to receive a control request message of a path that is configured by a network manager; or receive a control request message of a path that is driven by an application layer; or receive a control request message of a path that is driven by a transport network.

It should be noted that the control request message of the path includes: an establishment request message of the path, a modification request message of the path, a deletion request message of the path, a rerouting request message of the path, or the like. The path configuration message is an OF message or an XML message. The transport network includes any one of the following: an SDH, an SONET, an OTN, WDM, and the like.

The transmitter 123 is specifically configured to send a message that includes a configurable location and configurable content of the atomic behavior to the at least one node correspondingly, so that each node configures the transport plane according to the configurable location and the configurable content of the atomic behavior.

The foregoing controller may execute the foregoing method embodiments. Implementation principles thereof are similar, and details are not provided herein again.

In this embodiment, after receiving a control request of a path, a controller determines, according to topology information of a transport network and an atomic behavior that is supported by each node in the transport network, at least one node that the path passes through in the transport network and at least one atomic behavior that the at least one node needs to execute; and sends a path configuration message that includes the atomic behavior to the at least one node, so that each node configures a transport plane to execute the atomic behavior included in the message. Therefore, when the transport network needs to be extended to support a new control function, it only needs to instruct a node included in the path to execute a corresponding atomic behavior. In this way, a new function can be rapidly implemented and an upgrading risk can be reduced.

Figure 13:
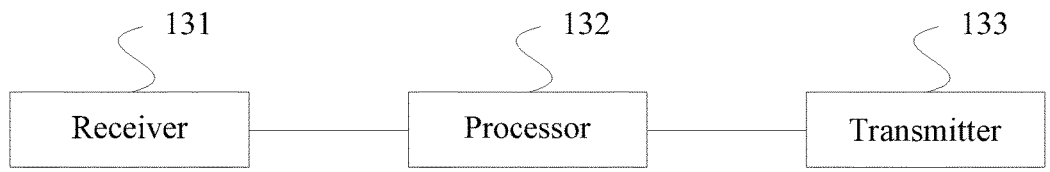
FIG. 13 is a schematic structural diagram of a node according to Embodiment 2 of the present invention.

FIG. 13 is a schematic structural diagram of a node according to Embodiment 2 of the present invention. The node is any node in nodes determined by a controller that a path passes through. As shown in FIG. 13, the node includes: a receiver 131 and a processor 132.

The receiver 131 is configured to receive a path configuration message that is sent by a controller and includes an atomic behavior; and the processor 132 is configured to configure a transport plane according to the path configuration message, and execute the atomic behavior included in the message.

Further, referring to FIG. 13, the node further includes: a transmitter 133. Specifically, the transmitter 133 is configured to send a supported atomic behavior to the controller by using a control channel between the node and the controller.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present invention, but are not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A transport network control method, comprising:
   receiving, by a controller, a control request message of a path;
   determining, by the controller according to topology information of a transport network and an atomic behavior that is supported by each node in the transport network, at least one node that the path passes through in the transport network and at least one atomic behavior that the at least one node needs to execute; and
   sending, by the controller, a path configuration message that comprises a corresponding atomic behavior to the at least one node, so that each node configures a transport plane to execute the atomic behavior comprised in the message, to implement a transport function requested in the control request message;
   wherein an atomic behavior is a basic action forming a function that can be completed by a node.

2. The method according to claim 1, further comprising, before the receiving, by a controller, a control request message of a path:
   acquiring, by the controller, the topology information of the transport network and the atomic behavior that is supported by each node in the transport network.

3. The method according to claim 2, wherein the acquiring, by the controller, the topology information of the transport network and the atomic behavior that is supported by each node in the transport network comprises one of:
   receiving, by the controller, the topology information of the transport network and the atomic behavior that is supported by each node in the transport network that are input by a user; and
   acquiring, by the controller by using a control channel established with each node in the transport network, the topology information of the transport network and the atomic behavior that is supported by each node in the transport network.

4. The method according to claim 3, wherein the acquiring, by the controller by using a control channel established with each node in the transport network, the topology information of the transport network and the atomic behavior that is supported by each node in the transport network comprises:
   establishing, by the controller, the control channel to each node in the transport network;
   collecting, by the controller, the topology information of the transport network by using the control channel; and
   receiving, by using the control channel, the atomic behavior that is supported and sent by each node in the transport network.

5. The method according to claim 1, wherein the determining, by the controller according to topology information of a transport network and an atomic behavior that is supported by each node in the transport network, at least one node that the path passes through in the transport network and at least one atomic behavior that the at least one node needs to execute comprises:
   invoking, by the controller, a control plug-in according to the control request message, wherein the control plug-in is used to calculate, according to the topology information of the transport network, the at least one node that the path passes through; and determining, by the controller according to the atomic behavior that is supported by each node in the transport network, the at least one atomic behavior that the at least one node needs to execute.

6. The method according to claim 5, further comprising, before the invoking, by the controller, a corresponding control plug-in according to the control request message:

maintaining, by the controller, the control plug-in that is installed by using a control plug-in interface.

7. The method according to claim 1, wherein the receiving, by a controller, a control request message of a path comprises one of:

receiving, by the controller, a control request message of a path that is configured by a network manager;

receiving, by the controller, a control request message of a path that is driven by an application layer; and receiving, by the controller, a control request message of a path that is driven by a transport network.

8. The method according to claim 1, wherein the control request message of the path comprises one of:

an establishment request message of the path, a modification request message of the path, a deletion request message of the path, and a rerouting request message of the path.

9. The method according to claim 1, wherein
the atomic behavior comprises:
a configurable location and configurable content of the atomic behavior; and
the sending, by the controller, a message that comprises the corresponding atomic behavior to the at least one node, so that each node executes the atomic behavior comprised in the message, to configure the transport plane comprises:
sending, by the controller, a message that comprises the corresponding configurable location and the corresponding configurable content of the atomic behavior to the at least one node, so that each node configures the transport plane according to the configurable location and the configurable content of the atomic behavior.

10. A transport network control method, comprising:
receiving, by a node, a path configuration message that is sent by a controller and comprises an atomic behavior that the node needs to execute, wherein the atomic behavior consisting of one of: an ODU cross, 1+1 protection-source end, and (3) 1+1 protection-sink end, is a basic function forming a function that can be completed by a node, and the atomic behavior comprises a configurable location and configurable content of the atomic behavior;
configuring, by the node, a transport plane according to the configurable location and the configurable content of the atomic behavior contained in the path configuration message, and executing the atomic behavior comprised in the path configuration message to implement a transport function requested in a control request message received by the controller.

11. The method according to claim 10, further comprising, before the receiving, by a node, a path configuration message that is sent by a controller and comprises an atomic behavior:
sending, by the node, a supported atomic behavior to the controller by using a control channel between the node and the controller.

12. A controller, comprising:
a receiver, a processor, a transmitter, and a non-transitory computer-readable storage medium including computer-executable instructions executed by the processor to perform operations comprising:
receiving, by the receiver, a control request message of a path;
determining, according to topology information of a transport network and an atomic behavior that is supported by each node in the transport network, at least one node that the path passes through in the transport network and at least one atomic behavior that the at least one node needs to execute; and
sending, by the transmitter, a path configuration message that comprises a corresponding atomic behavior to the at least one node, so that each node configures a transport plane to execute the atomic behavior comprised in the message, to implement a transport function requested in the control request message;
wherein an atomic behavior is a basic action forming a function that can be completed by a node.

13. The controller according to claim 12, wherein the operations further comprise acquiring the topology information of the transport network and the atomic behavior that is supported by each node in the transport network.

14. The controller according to claim 13, wherein the acquiring the topology information of the transport network and the atomic behavior that is supported by each node in the transport network comprises one of:
receiving the topology information of the transport network and the atomic behavior that is supported by each node in the transport network that are input by a user; and
acquiring, by using a control channel established with each node in the transport network, the topology information of the transport network and the atomic behavior that is supported by each node in the transport network.

15. The controller according to claim 14, wherein the acquiring, by using a control channel established with each node in the transport network, the topology information of the transport network and the atomic behavior that is supported by each node in the transport network comprises:
establishing the control channel to each node in the transport network;
collecting the topology information of the transport network by using the control channel; and
receiving, by the receiver by using the control channel, the atomic behavior that is supported and sent by each node in the transport network.

16. The controller according to claim 12, wherein the determining, according to topology information of a transport network and an atomic behavior that is supported by each node in the transport network, at least one node that the path passes through in the transport network and at least one atomic behavior that the at least one node needs to execute comprises:
invoking a control plug-in according to the control request message, wherein the control plug-in is used to calculate, according to the topology information of the transport network, the at least one node that the path passes through; and
determining, according to the atomic behavior that is supported by each node in the transport network, the at least one atomic behavior that the at least one node needs to execute.

17. The controller according to claim 12, wherein the operations further comprise maintaining the control plug-in that is installed by using a control plug-in interface.

18. The controller according to claim 12, wherein the receiving, by the receiver, a control request message of a path comprises one of:
- receiving, by the receiver, a control request message of a path that is configured by a network manager;
- receiving, by the receiver, a control request message of a path that is driven by an application layer; and
- receiving, by the receiver, a control request message of a path that is driven by a transport network.

19. The controller according to claim 12, wherein the control request message of the path comprises one of:
- an establishment request message of the path, a modification request message of the path, a deletion request message of the path, and a rerouting request message of the path.

20. The controller according to claim 12, wherein the sending, by the transmitter, a message that comprises the corresponding atomic behavior to the at least one node, so that each node executes the atomic behavior comprised in the message, to configure the transport plane comprises sending, by the transmitter, a message that comprises a corresponding configurable location and corresponding configurable content of the atomic behavior to the at least one node, so that each node configures the transport plane according to the configurable location and the configurable content of the atomic behavior.

\* \* \* \* \*